United States Patent
Rupp et al.

(10) Patent No.: US 7,499,876 B2
(45) Date of Patent: Mar. 3, 2009

(54) METHOD AND APPARATUS FOR CONFIGURABLY ADJUSTING A BID IN AN ONLINE AUCTION

(75) Inventors: William D. Rupp, Mt. Lebanon, PA (US); Douglas R. Wagner, Bethel Park, PA (US); Kimberly A. Harrigal, Pittsburgh, PA (US); Robert B. Lang, Jr., Glenshaw, PA (US); Scott W. Atkinson, Pittsburgh, PA (US); Daniel Abeshouse, Edgewood, PA (US)

(73) Assignee: Ariba, Inc., Sunnyvale, CA (US)

( * ) Notice: Subject to any disclaimer, the term of this patent is extended or adjusted under 35 U.S.C. 154(b) by 843 days.

(21) Appl. No.: 09/753,347

(22) Filed: Dec. 29, 2000

(65) Prior Publication Data

US 2001/0042039 A1 Nov. 15, 2001

Related U.S. Application Data

(63) Continuation-in-part of application No. 09/252,790, filed on Feb. 19, 1999, now Pat. No. 6,230,146.

(51) Int. Cl.
*G06Q 40/00* (2006.01)
(52) U.S. Cl. .......................................... 705/26; 705/37
(58) Field of Classification Search ................... 705/37, 705/26
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,842,275 A | 6/1989 | Tsatskin | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |

(Continued)

FOREIGN PATENT DOCUMENTS

CA 2069955 6/1991

(Continued)

OTHER PUBLICATIONS

Rockoff et al. (Design of an Internet-based system for remote Dutch auctions, Internet Research: Electronic Networking Applications and Policy, vol. 5- No. 4- 1995, pp. 10-16).*

(Continued)

*Primary Examiner*—Jagdish N Patel
(74) *Attorney, Agent, or Firm*—Van Pelt, Yi & James LLP (57) ABSTRACT

A method and apparatus for configuring and entering bids in an auction is disclosed. The method includes displaying a bid adjustment mechanism configuration interfaced to a bidder. Thereafter, a bid adjustment value for the bid adjustment mechanism is set using the configuration interface. Following the setting step, upon actuation of the bid adjustment mechanism, a bid is adjusted by the bid adjustment value previously set using the configuration interface.

17 Claims, 7 Drawing Sheets

U.S. PATENT DOCUMENTS

| | | | |
|---|---|---|---|
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |
| 5,664,115 A | 9/1997 | Fraser | |
| 5,684,963 A | 11/1997 | Clement | |
| 5,689,652 A | 11/1997 | Lupien et al. | |
| 5,715,402 A | 2/1998 | Popolo | |
| 5,721,735 A * | 2/1998 | Smiroldo | 370/442 |
| 5,727,165 A | 3/1998 | Ordish et al. | |
| 5,758,327 A | 5/1998 | Gardner et al. | |
| 5,758,328 A | 5/1998 | Giovannoli | |
| 5,765,138 A | 6/1998 | Aycock et al. | |
| 5,774,873 A | 6/1998 | Berent et al. | |
| 5,794,207 A | 8/1998 | Walker et al. | |
| 5,794,219 A | 8/1998 | Brown | |
| 5,797,127 A | 8/1998 | Walker et al. | |
| 5,799,151 A | 8/1998 | Hoffer | |
| 5,799,285 A | 8/1998 | Klingman | |
| 5,802,502 A | 9/1998 | Gell et al. | |
| 5,803,500 A | 9/1998 | Mossberg | |
| 5,809,483 A | 9/1998 | Broka et al. | |
| 5,826,244 A | 10/1998 | Huberman | |
| 5,832,496 A | 11/1998 | Anand et al. | |
| 5,835,896 A | 11/1998 | Fisher et al. | |
| 5,862,223 A | 1/1999 | Walker et al. | |
| 5,890,138 A | 3/1999 | Godin et al. | |
| 5,897,621 A | 4/1999 | Boesch et al. | |
| 5,905,974 A | 5/1999 | Fraser et al. | |
| 5,905,975 A | 5/1999 | Ausubel | |
| 5,915,209 A | 6/1999 | Lawrence | |
| 5,966,699 A | 10/1999 | Zandi | |
| 6,014,627 A | 1/2000 | Togher et al. | |
| 6,021,398 A | 2/2000 | Ausubel | |
| 6,023,685 A | 2/2000 | Brett et al. | |
| 6,026,383 A | 2/2000 | Ausubel | |
| 6,044,363 A | 3/2000 | Mori et al. | |
| 6,055,518 A | 4/2000 | Franklin et al. | |
| 6,058,379 A * | 5/2000 | Odom et al. | 705/37 |
| 6,061,663 A | 5/2000 | Bloom et al. | |
| 6,078,906 A | 6/2000 | Huberman | |
| 6,119,229 A | 9/2000 | Martinez et al. | |
| 6,151,589 A | 11/2000 | Aggarwal et al. | |
| 6,161,099 A | 12/2000 | Harrington et al. | |
| 6,199,050 B1 | 3/2001 | Alaia et al. | |
| 6,216,114 B1 | 4/2001 | Alaia et al. | |
| 6,223,167 B1 | 4/2001 | Alaia et al. | |
| 6,230,146 B1 | 5/2001 | Alaia et al. | |
| 6,230,147 B1 | 5/2001 | Alaia et al. | |
| 6,243,691 B1 * | 6/2001 | Fisher et al. | 705/37 |
| 6,266,652 B1 | 7/2001 | Godin et al. | |
| 6,285,989 B1 | 9/2001 | Shoham | |
| 6,366,891 B1 | 4/2002 | Feinberg | |
| 6,401,080 B1 * | 6/2002 | Bigus et al. | 705/37 |
| 6,408,283 B1 | 6/2002 | Alaia et al. | |
| 6,415,269 B1 * | 7/2002 | Dinwoodie | 705/37 |
| 6,449,601 B1 * | 9/2002 | Friedland et al. | 705/37 |
| 6,499,018 B1 | 12/2002 | Alaia et al. | |
| 6,850,907 B2 | 2/2005 | Lutnick et al. | |
| 7,076,460 B2 * | 7/2006 | Dinwoodie | 705/37 |
| 2004/0059646 A1 | 3/2004 | Harrington et al. | |

FOREIGN PATENT DOCUMENTS

| | | |
|---|---|---|
| CA | 2080452 | 5/1993 |
| CA | 2298 481 | 9/1998 |
| EP | 0399850 A | 11/1990 |
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |
| WO | WO 00/17797 | 3/2000 |
| WO | WO 00/79463 A1 | 12/2000 |
| WO | WO 01/54040 A1 | 7/2001 |

OTHER PUBLICATIONS

"BroadVision Developing First Interactive Commerce Management System To Support Online Sales & Marketing Process; New Software Category Necessary to Interactive Network Architecture", Business Wire, p. 5150152, May 15, 1995.

"FairMarket Launches New Self-Serve Auctions." Business Wire, p. 6161495, Jun. 16, 1998.

Lee, "Do electronic marketplaces lower the price of goods?", Communications of the PCM, v41n1 pp. 73-80 Jan. 1998.

"Moai Technologies Introduces New categories of Business to Business Auction Software..", Business Editors and Computer writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Aug. 25, 1997 Issue 1072, p. 86, 1/6p.

Sairamesh, et al., "Economic Framework for Pricing and Charging Digital Libraries", D-Lip Magazine, Feb. 1996.

"Sold! . . . To the Lowest Bidder", Computer Finance, v6, n2 Jul. 1995.

"Venture Capitalists Fund Two Massachusetts Internet Related Companies", Boston Globe, Jan. 14, 1998.

Vigoroso, "Buyers prepare for brave new world of e-commerce." Purchasing, v126, n6, p. S4(1), Apr. 22, 1999.

Von der Fehr, et al., "Predatory bidding in sequential auctions", Oxford Economics Papers, v46, n3, p. 345(12) Jul. 1994.

"What you need to know to bid in FCC's narrowband auction" Washington Telecom News, v2, n26, p. 6(2), Jun. 27, 1994.

Malone, et al., "The Logic of Electronic Markets", *Harvard Business Review*, No. 893II (May-Jun. 1989).

Freemarkets™ Online, "Bidware Manual" (Jun. 9, 1988).

Freemarkets Online™, "Online Industrial Market Making, An Overview of Purchasing Executives".

WebAuction.com, "How to Play" (1998).

Auction Sales, "Live Auctions Online" (Sep. 1998).

Auction Port, "Online Auction Community—New Auctions Since Sep. 2, 1998" (Jul. 1998).

OnSale, "How to Play" (1998).

u-Auction-It™ (1997).

Freemarkets Online™, "Homepage" (1998).

Andrews, "Auctions Catch the Interest of Hobbyists and Big Business", Aug. 24, 1998.

Associated Press, "Auction on Web is Buyer's Market", Apr. 6, 1998.

Steinert-Threlkeld, "New Watchwords: Let Sellers Beware", Jun. 1, 1998.

Woolley, "E-muscle", Mar. 9, 1998.

Associated Press, "FreeMarkets Takes Auction on Internet", Feb. 23, 1998.

Jahnke, "How Bazaar", CIO Web Business Magazine (Aug. 27, 1998).

Wilder, "What's Your Bid? —FreeMarkets' real-time online bidding technology lets clients drive down costs and improve product value", Nov. 10, 1997, *Information Week*.

Jean-Pierre Banatre, et al., "The Design and Building of Enchere, a Distributed Electronic Marketing System" Communications of the ACM, No. 1 (Jan. 29, 1986).

Danny Cohen, "Computerized Commerce" Information Processing 89 (Aug. 28-Sep. 1, 1989).

Fox, "*The Calm Way of Buying and Selling Livestock,*" Sydney Morning Herald, Oct. 10, 1988.

M2 Presswire, "*ShoppersUniverse brings bidding to the Internet with the first ever on-line auction room*", Aug. 27, 1996, 2 pages.

Jackson, "*FCC Charges for Online Bidding*", Government Computer News, Jan. 27, 1997, 3 pages.

Newswire Press Release, "*Ingram Micro Launches Real-Time Online Auction Site*", Santa Ana, California, Feb. 11, 1998, 3 pages.

Business Wire "*Adauction.com Boosts Revenue with Enhanced Ad Auction Format; Morning and Afternoon Auctions and 'AutoExtend' Feature Maximize Opportunistic Media Buying on the Web,*" May 4, 1998, 2 pages.

Woods, "*Excite Calls Online Auctions*", Newsbytes News Network, Jun. 10, 1998, 2 pages.

Kumar, M., et al., "*Internet Auctions,*" Third USENIX Workshop on Electronic Commerce Proceedings, Boston, Massachusetts, Aug. 31-Sep. 3, 1998, 13 pages.

Reck, M., "*Types of Electronic Auctions*" Hochschule St. Gallen, in Schertler W., Schmid B., Tjoa A. & Werthner H. (Eds.) (1994) 'Information and Communication Technologies in Tourism', Springer-Verlag, 1994, 8 pages.

Wrigley, C., "*Design Criteria for Electronic Market Servers*", International Journal of Electronic Markets, vol. 7, No. 4, 1997, 5 pages.

Business Wire, "*Shawmut National Will Auction $46 Million In Commercial Real Estate in December*", Nov. 3, 1992, 2 pages.

Wurman et al., "*The Michigan Internet AuctionBot: A Configurable Auction Server for Human and Software Agents,*" Artificial Intelligence Laboratory, University of Michigan (1998).

Buyer's Auction Online, "*New User Information*", http://buyersauction.com/userinfo.htm, 1998, 5 pages.

Ervin, K., "*Three Tree Point Property Draws $1.5 Million Bid: [Final Edition]*", Seattle Times, Feb. 11, 1998, 2 pages.

Rockoff, Todd E. and Groves, Michael, "Design of an Internet-based system for remote Dutch auctions," Internet Research: Electronic Networking Applications and Policy, vol. 5, No. 4, pp. 10-16 (1995).

FCC Auction, Procedures, Terms and Conditions retrieved from <http://wireless.fcc.gov/auctions/17/releases/lmdsbp_b.pdf>, Dec. 1997.

\* cited by examiner

FIG. 4 AUCTION NETWORK

METHOD AND APPARATUS FOR CONFIGURABLY ADJUSTING A BID IN AN ONLINE AUCTION

REFERENCE TO RELATED APPLICATION

This application is a continuation-in-part of U.S. patent application Ser. No. 09/252,790, entitled "Method and System for Conducting Electronic Auctions", filed Feb. 19, 1999, now U.S. Pat. No. 6,230,146, and in the names of Marc Alaia, Dave Becker, Tony Bernard, Daniel Heckmann, Sam Kinney, Glen Meakem, Vincent Rago, Jason Reneau, Fred Roberts, Bill Rupp and Rob Stevens, assigned to the assignee of the present Application, FreeMarkets, Inc. The entirety of this earlier filed patent application is hereby expressly incorporated herein by reference.

BACKGROUND OF THE INVENTION

1. Field of the Invention

The disclosed invention relates generally to conducting electronic auctions, and in particular to a method of adjusting bids in electronic auctions.

2. Description of Background

Procurement of goods and services has traditionally involved high transaction costs, especially information search costs. The introduction of electronic commerce has introduced new methods of procurement that lower some of the transaction costs associated with procurement. Online procurement, in particular business-to-business electronic commerce, matches buyers and suppliers so that transactions can take place electronically.

Four models of online procurement have been developed: catalog, buyer-bidding auctions, seller-bidding auctions and exchange marketplaces.

The "catalog" model was the earliest form of online procurement. Initially, catalogs were developed by sellers, typically suppliers, to help customers obtain information about products, and order supplies electronically. These first electronic catalogs were single-source; i.e. they only allowed customers to obtain information and products from that supplier.

Although these first electronic catalogs greatly reduced the information search costs associated with procurement, customers were disadvantageously "locked in" to one supplier at each electronic catalog. Customers were thus unable to compare a number of competing products in a single catalog. Therefore suppliers with single-source catalogs began including competitors' products in their systems. The inclusion of competing products in electronic catalogs reduced procurement information search costs even further. By offering competing products, electronic catalogs became "electronic markets".

However, many of these catalog systems are biased toward the supplier offering the electronic catalog. Therefore, third-party "market makers" have developed unbiased markets for many standard products and services. By having a market maker develop a market for certain products by offering an unbiased electronic catalog, procurement costs are further lowered by promoting competition between suppliers as well as reducing information search costs for buyers.

Electronic commerce using the electronic catalog model typically involves one buyer and one seller at a time. When many buyers compete for the right to buy from one seller, a buyer-bidding auction model, or forward auction is created.

In a forward auction, various goods or services may be simultaneously placed for auction. As in an offline auction, bid prices start low and move upward as bidders interact to establish a closing price. Typically, the auction marketplace is one-sided, with one seller and many potential buyers, although multiple-seller auctions are possible.

The catalog and buyer-bidding auction models have limitations and do not work in every situation. For example, if a buyer requires a custom product, it is not possible for suppliers to publish set prices for a catalog market. Therefore, when a buyer requires a custom or hard-to-find product, pricing for that product typically will not be found in a catalog. Likewise, it is difficult to specify a custom product and identify buyers who might use that custom product for a buyer-bidding auction. There are fewer suppliers and no standard product and pricing information available for the buyer of custom industrial products.

Traditionally, when a company requires a custom product, a buyer for the company procures the product by searching for potential suppliers, then acquiring price quotes from the potential suppliers for the needed custom product. The search is slow and random, and typically relies heavily on personal relationships. The costs associated with locating vendors, comparing prices, and negotiating a deal are therefore large. The cost of switching suppliers is also very large, which means that an incumbent supplier's quoted price is most likely not the lowest price he could offer because the incumbent supplier knows the buyer would face switching costs to use another supplier. As a consequence, new suppliers have a difficult time entering the market.

Therefore, supplier-bidding auctions for products and services defined or specified by a buyer have been developed. The assignee of the present application has developed a system in which sellers downwardly bid against one another to achieve the lowest market price in a supplier-bidding auction.

In both forward and reverse auctions, the dynamics of bidding in an auction work to the advantage of the sponsor of the auction. For example, in a forward auction, bidders may bid more than they would have paid otherwise for a product or service during the final "going, going, gone" stage of the auction because of the time pressure and excitement of the auction atmosphere. Likewise, in a reverse auction, bidders may bid less than they would have bid on a supply contract outside the auction.

To take full advantage of these types of bidding dynamics, an electronic auction should facilitate bid entry. If the process of submitting a bid to the electronic auction is difficult or cumbersome, the bidder may be less likely to make a bid. Additionally, in the final stages of an auction, bids are made very rapidly, and a bidder must be able to enter a competitive bid quickly and easily in order to "beat the clock".

Additionally, in many auctions, bids are dependent on more than price. For example, in a reverse auction for custom industrial supplies, a bidder may be bidding both price and volume. Thus, it would be desirable to have a system that allowed a bidder to easily and quickly change any aspect of his bid, not just price.

Therefore, what is needed is a method of entering and adjusting bids that allows the bidder to easily set or change any aspect of the bid and submit the bid into an electronic auction.

SUMMARY OF THE INVENTION

In accordance with one form of the present invention, there is provided a method for configuring and entering bids in an electronic auction. The method includes displaying a bid adjustment mechanism configuration interface to a bidder. Thereafter, a bid adjustment value for the bid adjustment mechanism is set using the configuration interface. Following the setting step, upon actuation of the bid adjustment mechanism, a bid is adjusted by the bid adjustment value previously set using the configuration interface. In one embodiment, the bid adjustment mechanism is a button on a graphical user interface displayed to the bidder. In addition, in accordance with a further aspect, the bid adjustment value may correspond to either an absolute value or a percentage of a previous bid. In accordance with this further aspect, the type of bid adjustment (e.g. absolute value or percentage) is selected at the time the bid adjustment value is set using the configuration interface.

In accordance with a further embodiment, the present invention is directed to a method of configuring bid adjustment mechanisms in an online auction, wherein bids in the auction are comprised of at least two parameters, such as price and quantity. In the claimed method, each bid parameter may be adjusted using a different bid adjustment mechanism. Again, the bid adjustment mechanism may, for example, be a button or a graphical user interface displayed to the bidder during the auction. In the inventive method, a bid adjustment mechanism configuration interface is displayed to the bidder. Next, a bid adjustment value for each of the bid parameters is set. Thereafter, when a bid adjustment mechanism for a given bid parameter is actuated, the given bid parameter is adjusted by the bid adjustment value set for the given bid parameter using the configuration interface. In accordance with a further aspect, for each given one of the bid parameters, a bid adjustment type is preferably selected when the bid adjustment value for the given bid parameter is set.

In accordance with a still further aspect, the present invention is directed to a computer-implemented apparatus for configuring a bid adjustment component of an application for submitting bids to an electronic auction. The system includes a user-interface that displays bid adjustment mechanism configuration options to a bidder. Also included is a processor, coupled to the user-interface, that sets a bid adjustment value for the bid adjustment mechanism. Upon actuation of the bid adjustment mechanism, a bid is adjusted by the bid adjustment value.

An apparatus for configuring and entering bids is also disclosed. The apparatus includes a computer readable medium having stored thereon instructions which, when executed by a processor, cause the processor to provide a user selectable facility which, when selected, provides the user with the ability to configure different aspects of a bid and submit an adjusted bid.

Thus, the present invention provides a method and apparatus that beneficially encourages bidders to place bids. The present invention also provides a method and apparatus to actively participate in an electronic auction by submitting adjusted bids.

DETAILED DESCRIPTION

Reference will now be made in detail to the preferred embodiments of the present invention, examples of which are illustrated in the accompanying drawings. It is to be understood that the Figures and description of the present invention included herein illustrate and describe elements that are of particular relevance to the present invention, while eliminating, for purposes of clarity, other elements found in typical auction systems and computer networks. The present invention described below extends the operation of the inventive auction systems and methods described in greater detail in co-pending application Ser. No. 09/252,790, entitled "Method and System for Controlling Closing Times of Electronic Auctions Involving Multiple Lots" filed Feb. 19, 1999, the disclosure of which is hereby expressly incorporated in the present application.

In a reverse auction, bid prices start high and move downward as bidders interact to establish a closing price. Typically, the auction marketplace is one-sided, with one buyer and many bidders, although multiple-buyer auctions are possible. In a supplier-bidding reverse auction, bidders are potential suppliers bidding for the right to supply the buyer, or sponsor of the auction, with the products or services in the auction.

In a supplier-bidding auction for custom industrial parts, the products being purchased are components or materials. "Components" may include fabricated tangible pieces or parts that become parts of assemblies of durable products. Example components include gears, bearings, and appliance shelves. "Materials" may include bulk quantities of raw materials that are further transformed into products. Example materials include corn syrup and sheet steel. Services may also be purchased in a reverse auction.

Industrial buyers do not typically purchase one component at a time. Rather, they tend to purchase whole families of similar components. Therefore, in a typical industrial supplier-bidding auction, products are grouped together in "lots" for bidding. Each lot is composed of several "line items". In the auction, the suppliers are bidding on supplying the buyer with everything within a lot. By lotting products, potential suppliers can bid on only that portion of the business for which they are best suited, and are not required to bid on every lot. This reduces some of the barriers to entry for new potential suppliers that may only have capability to supply some of the needed products in the auction. Reducing the barriers to entry also benefits the buyer as additional bidders increase competition, and result in better bidding dynamics.

Typically, components in the auction are strongly related to one another. As an example, a buyer might purchase a given plastic knob in two different colors, or might purchase a nameplate in four different languages. These parts are so similar that by definition they must be purchased from the same supplier—all of the knobs are made using with same mold. These items will typically be grouped in a single "lot".

As is known by one skilled in the art, there are many additional methods of lotting products for an auction.

Bidding in an auction with lots may be at the lot level or at the line item level. If bidding occurs at the lot level, bidders bid a price for supplying every product or service in a lot. If bidding occurs at the line item level, bidders bid a price for each line item, and these line item bids are aggregated by the auction software into a lot-level bid. In either case, competition occurs at the lot level.

Figure 1A:
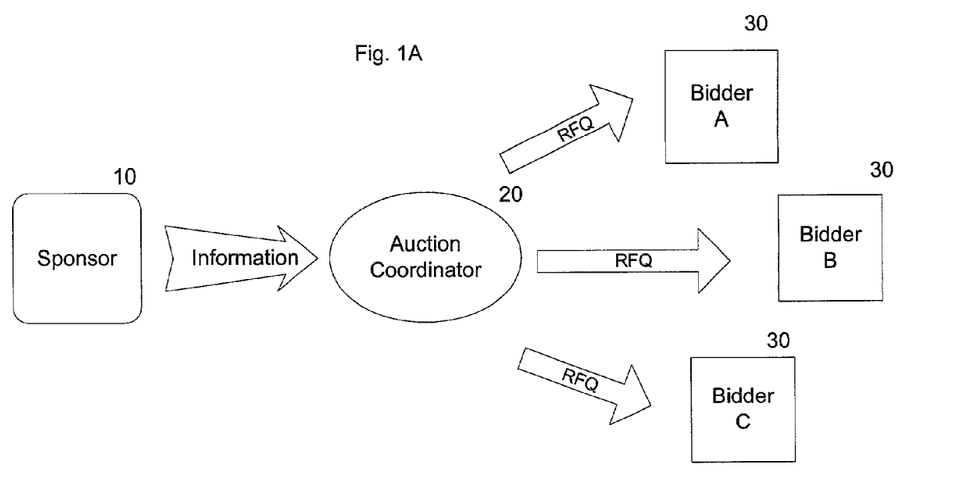
FIG. 1 is a schematic illustration of the elements and entities involved in an embodiment of an auction.
Figure 1B:
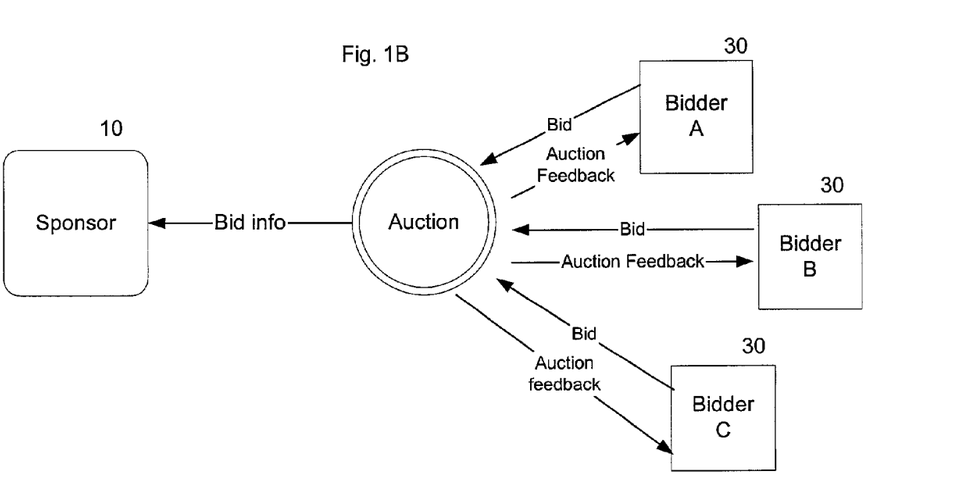
Figure 1C:
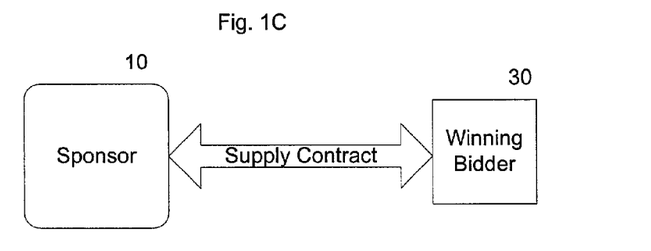

The basic process for a supplier-bidding auction as conducted by the assignee of the present invention is described below with reference to FIG. 1. FIG. 1 illustrates the functional elements and entities in setting up and conducting a typical supplier-bidding auction. FIG. 1A illustrates the creation of an auctioning event, FIG. 1B illustrates the bidding during an auction, and FIG. 1C illustrates results after completion of a successful auction.

As will be apparent to one skilled in the art, while the invention is generally described in terms of one buyer and multiple suppliers, the present invention may also be used in other types of electronic markets, such as auctions with multiple buyers and multiple sellers, forward auctions having a single seller and multiple potential buyers, or electronic exchange marketplaces.

The term "sponsor" will be utilized herein to identify the party or parties that originate the auction. In a forward auction, for example, the sponsor is typically a seller of one or more goods or services. In a forward auction, the sponsor(s) might specify a good to be sold in the auction and receive bids from parties wishing to purchase that good. Those parties wishing to purchase that good are "bidders" in a forward auction.

In a reverse auction example, the sponsor is typically a purchaser or buyer of one or more goods or services. In a reverse auction, the sponsor(s) buyer might specify a good desired for purchase through the auction and receive bids from parties wishing to supply that good. Those parties wishing to supply that good are "bidders" in a reverse auction.

In the typical supplier-bidding auction model, the bidding product or service is defined by the sponsor of the auction. As shown in FIG. 1A, when the sponsor 10 decides to use the auctioning system of the present invention to procure products or services, the sponsor 10 provides information to an auction coordinator 20. This information may include information about incumbent suppliers and historic prices paid for the bidding products or services, for example. Typically, the sponsor 10 works with the auction coordinator 20 to define the bidding products and services, and if desired, lot the products and services appropriately so that the needed products and services can be procured using optimal auction dynamics. A specification may then be prepared for each desired product or service and a Request for Quotation (RFQ) generated for the auction.

Next, the auction coordinator 20 identifies potential suppliers 30, preferably with input from the sponsor 10, and invites the potential suppliers 30 to participate in the upcoming auction. The potential suppliers are given access to the RFQ, typically through a printed published RFQ document, although the RFQ may be published on an identified Website.

As shown in FIG. 1B, during a typical auction, bids are made against lots. Generally, bidders must submit actual unit prices for all line items within a lot, however, the competition in an auction is based on the aggregate value bid for lots. The aggregate value bid for a lot depends upon the level and mix of line item bids and the quantity of goods or services that are offered for each line item. Therefore, although bidders may submit bids at the line item level, they are competing on the lot level. During the auction, the sponsor 10 can typically monitor the bidding as it occurs. Bidders 30 may also be given some feedback on the auction activity so that they may bid competitively.

Feedback about bidding activity is generally referred to as "market feedback" and may include any information or data related to the bidders 30 or their bids, interrelationships between bids, and any other bid related information or data that is received before or during the auction. Market feedback may include, for example, bids that have been placed by other bidders, the rank of a bidder's bid in relation to one or more other bidders, the identity of bidders, or any subset of that information. Market feedback may also include non-pricing information such as, for example, the quality of goods to be provided by bidders and shipping costs associated with one or more bidders. Providing such market feedback to bidders in an auction helps create real-time competitive interaction among bidders in the auction because, without feedback, bidders who are not leading in an auction might not be aware of their relative position and have less incentive to revise price quotes and place additional competitive bids.

After the auction, the auction coordinator may analyze the auction results with the sponsor. In a supplier-bidding auction, the sponsor typically conducts final qualification of the low bidding supplier(s). The sponsor may retain the right not to award business to a low bidding supplier based on final qualification or other business concerns. As shown in FIG. 1C, at least one supply contract is usually drawn up and executed based on the results of the auction.

The auction is conducted electronically between bidders 30 at their respective remote sites and the auction coordinator 20 at its site. In an alternative embodiment, instead of the auction coordinator 20 managing the auction at its site, the sponsor 10 may perform auction coordinator tasks at its site.

Figure 2:
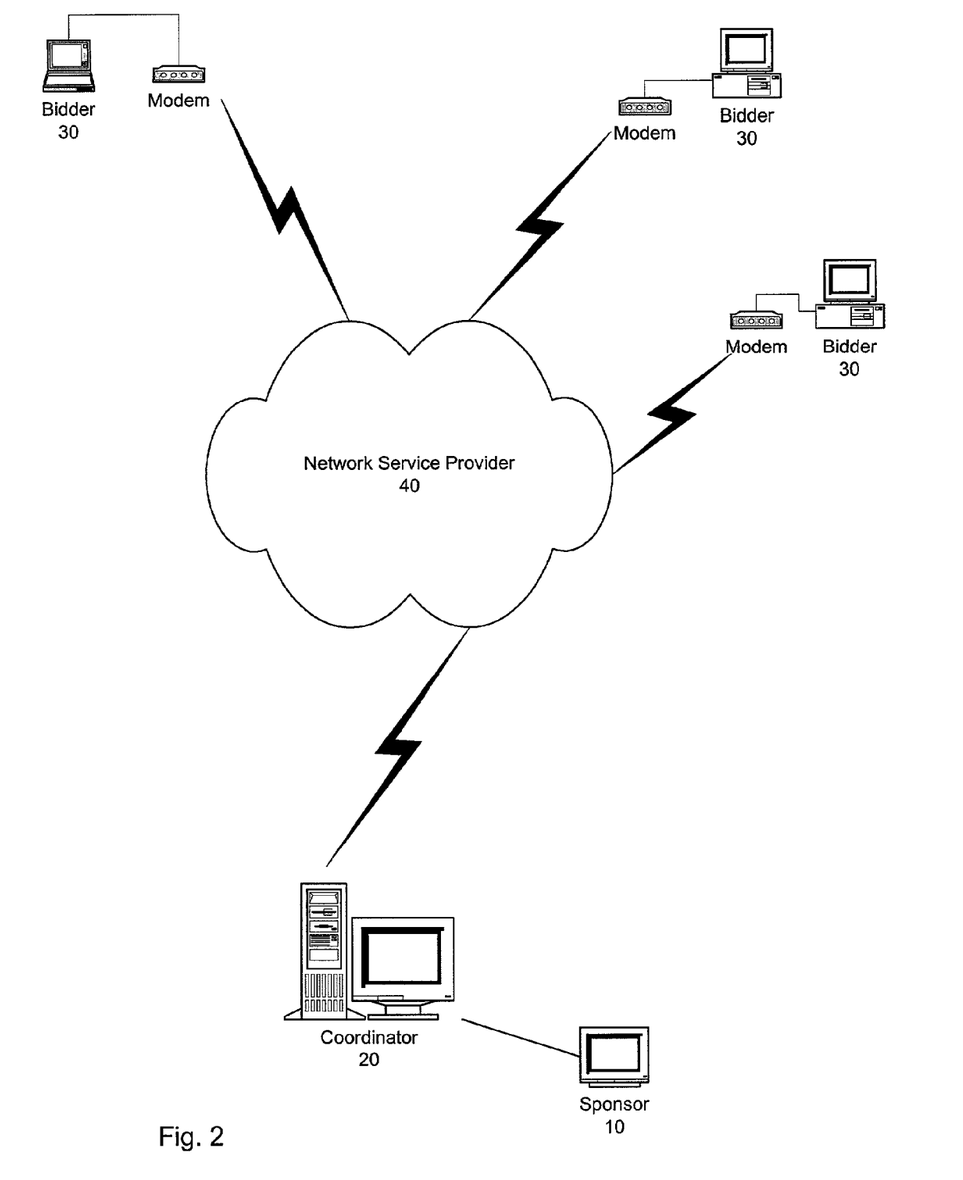
FIG. 2 is a tabular illustration of the tasks performed by the entities involved in the auction of FIG. 1.

Information is conveyed between the coordinator 20 and the bidders 30 via any known communications medium. As shown in FIG. 2, bidders 30 may be connected to the auction through the Internet via a network service provider accessed, for example, through a dial-up telephone connection. Alternatively, sponsors 10 and bidders 30 may be connected to the auction by communicating directly with the coordinator 20 through a public switched telephone network, a wireless network, or any other known connection method. Other methods of connecting sponsors and bidders and other communications mediums are known to those skilled in the art, and are intended to be included within the scope of the present invention.

Figure 3:
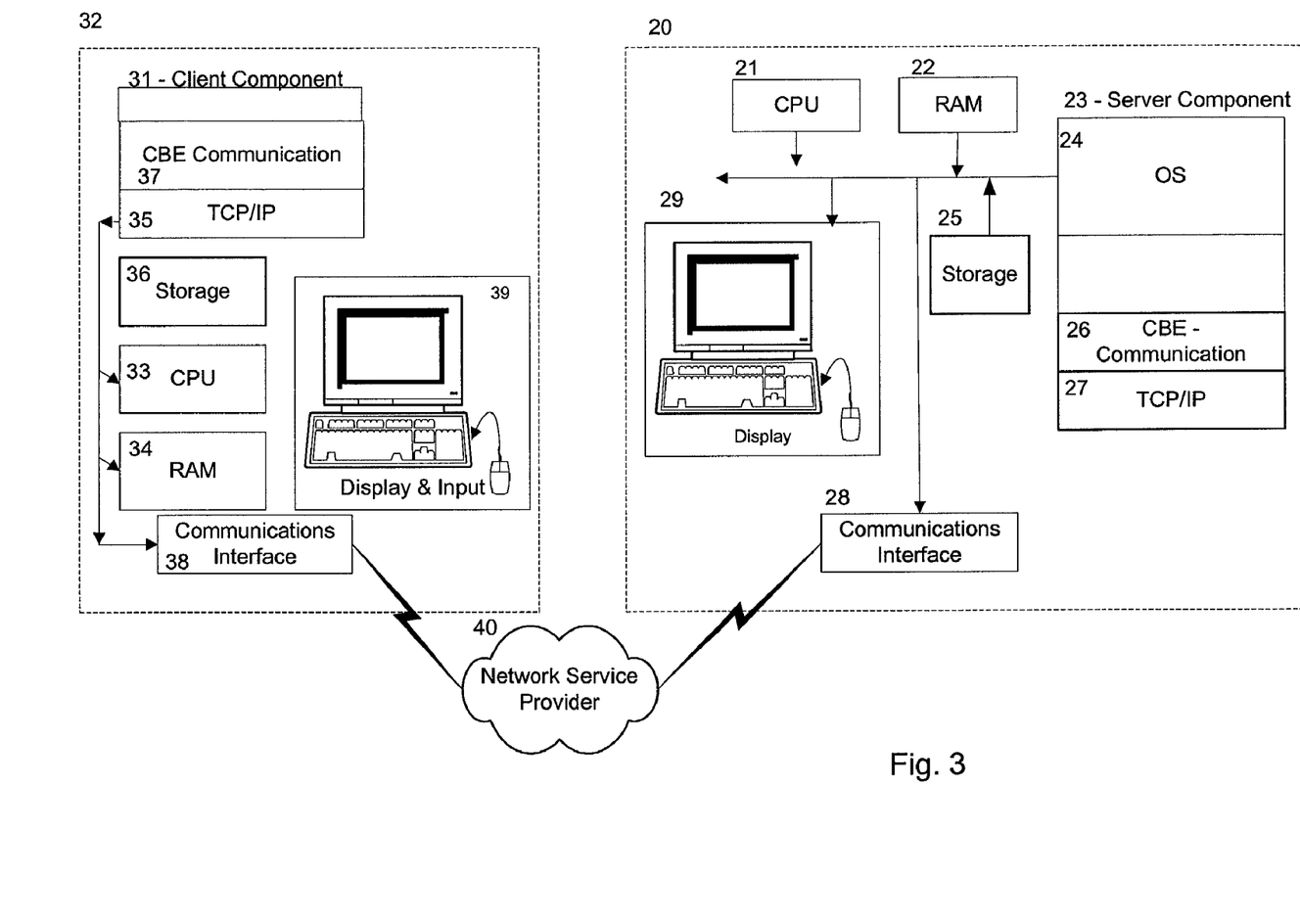
FIG. 3 is a schematic illustration of the communications links between the coordinator, the sponsor and the bidders in the auction of FIG. 1.

A computer software application is used to manage the auction. The software application preferably has two components: a client component 31 and a server component 23. FIG. 3 illustrates a server component 23 and a client component 31 resident in host computers in a first embodiment. As is shown in FIG. 3, the server component of that embodiment includes an operating system 24, competitive bidding event communications software 26, and Internet protocol software 27. The server software is hosted on a computer 20 having a processor 21, random access memory 22, and a data storage facility 23. The host computer 20 also includes input and output devices 29 such as, for example, a monitor, printer, mouse and keyboard, and a communications interface 28 for communicating with the client component 31.

The client component of the embodiment illustrated in FIG. 3 includes competitive bidding event communication software 37, and Internet protocol software 35. The client component software is hosted on a computer 32 having a processor 33, random access memory 34, and a data storage facility 36. The host computer 32 also includes input and output devices 39 such as, for example, a monitor, printer, mouse and keyboard, and a communications interface for communicating with the server component 23.

The client component 31 is used by the bidders to make bids during the auction, and to receive and display feedback from the auction. The client component may, for example, be a program that is installed on a bidder's computer, or it may be software that is accessed and run from a Website. The client component 31 preferably includes software and a graphical user interface for implementing the bid adjustment mechanisms described in connection with FIGS. 5-7 below. Bids are preferably only able to be submitted using the client component of the application, thereby ensuring that buyers cannot circumvent the bidding process, and that only invited bidders participate in the bidding. Each computer software application may be stored in a data storage device and executed by a processor such as those described in connection with FIG. 4 described hereinbelow.

Bids are sent over the communications medium to, for example, the auction coordinator, or where the sponsor is performing auction coordinator tasks, directly to the sponsor. Bids are received by the server component 23. The client component includes software functions for making a connection over the Internet, or other medium, to the server component. Bids are submitted over this connection and feedback is sent to connected bidders.

Although the present invention is described in terms of a server component and a client component, one skilled in the art will understand that the present invention is not limited to a client/server program relationship model, and may be implemented in a peer-to-peer communications model, or any other model known to those skilled in the art.

When a bidder submits a bid, that bid is sent to the server component and evaluated to determine whether it is a valid or acceptable bid. Market feedback about received bids is sent to connected bidders enabling bidders to see changes in market conditions and plan competitive responses.

The embodiments described herein utilize an online reverse auction, wherein the present invention is performed by a computer processor, as an example in which the present invention may be utilized. In these examples, suppliers bid to supply goods or services to a buyer and the buyer typically purchases the goods or services from the lowest priced qualified bidder. It is to be understood, however, that the present invention may be used in other applications. The auction does not necessarily have to occur online, and the present invention may be performed by other than a computer processor. The present invention may also be utilized in connection with auctions other than reverse auctions. For example, the present invention may be advantageously utilized with forward auctions, wherein the bidder offering the highest priced qualified bid, rather than the lowest priced qualified bid, is awarded the goods or services being sold. In the case of a forward auction, the "leading bid" is the highest bid and the leading bidder is the bidder making that highest offer, while in a reverse auction, the "leading" bid is the lowest bid and the leading bidders is the bidders making the lowest bid. Similarly, placing a "better bid" in a reverse auction indicates placing a lower bid, while placing a "better bid" in a forward auction indicates placing a higher bid.

Figure 4:
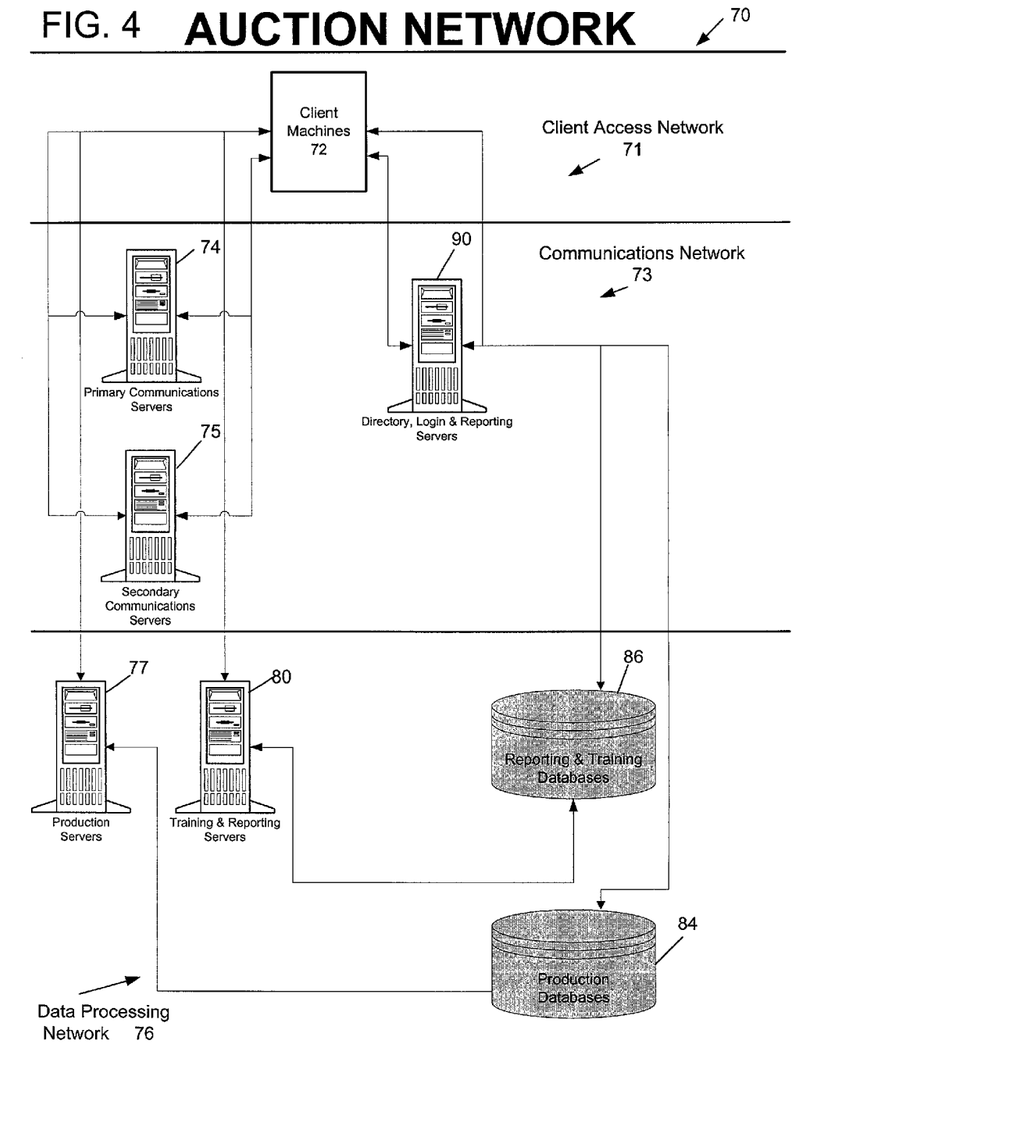
FIG. 4 is a schematic diagram of an auction network.

FIG. 4 is a diagram illustrating an auction network 70 of the present invention for operating an auction, and into which the server component 23 and client component 31 may be incorporated. The auction network 70 may be divided into three functional sections: a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are referred to collectively herein as bid servers 77 and 80.

The client machines 72 may be, for example, personal computers and may be located at each bidder 30 and sponsor site 10 for accessing the auction. The client machines 72 may access the auction by, for example, connecting to a web site operated by the party hosting the auction. The client machines 72 may also receive software from the communications network 73 that facilitates communications with the communications network 73. Each client machine 72 may have a processor that executes applicable software, and a data storage device that stores applicable software and other auction data.

The primary communications servers 74 are utilized to provide information to bids 58 received from the client machines 72 to the bid servers 77 and 80, and to provide that bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may be performed by a single server or include separate servers for the various functions. The directory, login, and reporting servers 90 may include a web server that acts as a portal for access to the auction network 70. As such, the directory, login, and reporting servers 90 will receive login requests for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions which may be utilized by sponsors 10 to make a decision as to which bidder 30 will be awarded the sale and to permit the sponsor 10 to consider the way in which the auction proceeded so that future auctions may be refined.

The production servers 77 run the bidding software that facilitates the auction process. The production servers 77 may communicate with client machines 72 through primary and secondary communications servers 74 and 75. The production servers 77 may also be redundant so that if a failure occurs in the production server 77 that is being utilized in an auction event, the redundant backup production server 77 may perform the functions of the failed production server 77 and, thus, prevent failure of the auction.

The training and reporting servers 80 operate in a manner similar to the production servers 77 and provide reports for auctions. It is useful to operate test auctions to test the operating systems and to train personnel and clients. Such testing may be performed on the production servers 77 or, to prevent any degradation of system operation in actual auctions, one or more separate training servers may be utilized for testing and training. Reporting may also be accomplished on the production servers 77 or the report creation functions may be off-loaded to one or more reporting servers 80. The reporting servers 80 may furthermore be combined with the training servers 80.

Each server 74, 75, 77, 80, and 90 may have a processor that executes applicable software, and a data storage device that stores applicable software and data.

Data related to auctions may furthermore be held in one or more storage devices. The data storage devices may, for example, be a magnetic storage device, a random access memory device (RAM), or a read only memory device (ROM). The data may include pre-auction data, post auction data, and data that is related to active auctions. Pre-auction data may include, for example, bidders 30 that are permitted to bid on a particular auction and the scheduled auction starting and ending times. Post auction data may include the bids and bid times received in a particular auction and reports displaying that data in user friendly formats. Active auction data may include data received from the bidders 30 as the auction is taking place and related data such as the rank of each bidder 30.

The "rank" of the bidders 30 is generally determined by comparing the lowest amount bid by each bidder 30 and ordering the bidders 30 according to those lowest bids. The bidder 30 ranked first is the bidder 30 that has bid an amount lower than any other bidder 30 in a reverse auction. The last rank may be a rank equal to the number of bidders 30 who have submitted bids in the auction. In the case of tie bids between bidders, the last rank may be a rank equal to the number of unique bids by each bidder. In a reverse auction based on price only, the bidder 30 having that last rank is the bidder 30 that has submitted the highest amount.

Of course, there are many known ways to calculate rank, and any of those may be used in connection with the subject invention, and are intended to be within the scope of the present invention. The bidders 30 are generally ranked between first and last according to the amounts of their lowest submitted bids in a reverse auction. Thus, a higher, or better ranked bidder 30 in a reverse auction is a bidder 30 who has placed a comparatively lower bid, while a higher, or better ranked bidder 30 in a forward auction is a bidder 30 who has placed a comparatively higher bid. An auction may alternately be based on one or more factors other than price, such as quality, delivery factors, and/or other factors that are referred to herein collectively as "total value." Thus, rank may also be based on factors other than price, including total value and any other factor that is useful in an auction setting. A bid or bid amount is a value that is submitted by each participating bidder 30 for comparison to the bids of other bidders 30, and may likewise be based on a variety of bid factors that are considered important to the bid participants. Those factors may include, for example, price, quality, other costs such as delivery costs, or a total value. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 illustrated provide a web portal for the client machines 72. The directory, login, and reporting servers 90 provide an initial contact point for the client machines 72, access to auctions in which the client machine 72 is permitted to participate, and reports relating to active and closed auctions.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

Figure 5A:
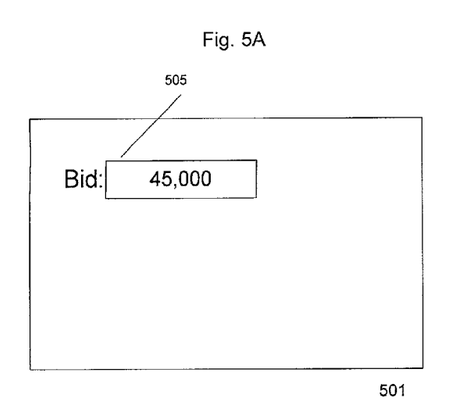
FIGS. 5A-5D illustrate several user-interfaces that incorporate bid adjustment buttons, in accordance with various embodiments of the present invention.

In one embodiment of the present invention, a bidder submits bids to the auction or sponsor using the client component 31. In the simplest case, the bidder may enter an absolute amount as a bid. This absolute amount can be any currency, such as U.S. dollars. FIG. 5A illustrates a user interface 501 (resident on client component 31) for entering or modifying a bid by entering the absolute dollar amount of the bid into the user interface. In this embodiment, the bidder types an amount into the price box 505, and the typed-in bid amount is then later submitted by client component 31 to the auction or sponsor.

However, in many auctions, bidders may also need to specify the amount of the product for which a bid is being submitted, as well as a price per unit product. This is especially true in a supplier-bidding auction for custom industrial products. There may also be other bid variables in a multi-variable auction, as disclosed in copending United States patent application entitled "Method and Apparatus for Multiple Variable Bidding in an Online Auction", filed concurrently herewith, the disclosure of which is herein incorporated by reference.

Additionally, in many auctions, some bidders may not be comfortable typing in a numerical bid value, for example, numerical keys on the bidder's keyboard, either because the amount of the bid is difficult to enter using such keys, or because the bidder may not be proficient or confident with respect to the bidder's ability to use the computer software operating on the bidder's computer, or other electronic device. Moreover, in a multi-lot auction, a bidder may be making bids in several lots at the same time. This increases the chances of the bidder making an error, as he may confuse lots and enter a bid for one lot into another lot.

The benefit of auctions comes from the competition between bidders. Therefore, it is important that the interface the bidders use be as simple and easy-to-use as possible so that bidders have no disincentives to stay competitive.

Figure 5B:
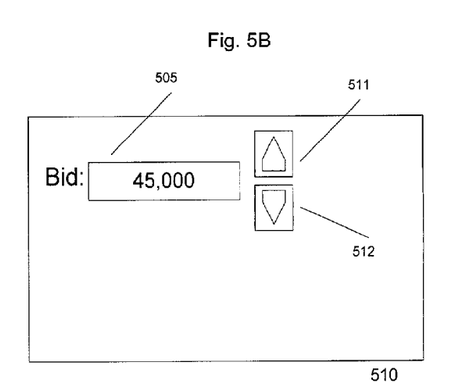

For these reasons, the bid adjustment mechanism of the present invention was developed. In one embodiment of the present invention, as shown in FIG. 5B, bid adjustment buttons 511 and 512 are added to user interface 510. Using bid adjustment buttons 511, 512, a bidder can adjust a previous bid a predefined increment up or down without entering an absolute bid value. The predefined increment is preferably set using, for example, the bid adjustment configuration interface shown in FIG. 6. The bid adjustment buttons 511, 512 may be used to increment or decrement either the previous bid submitted to the auction by the bidder, or the current leading bid, either of which may be shown in price box 505. Using these bid adjustment buttons, bidders are less likely to enter erroneous bids.

As discussed above, in one embodiment of the present invention, auctions may consist of several lots of products. A bidder submits a bid for a lot. A preferred embodiment of the present invention allows a bidder to configure bid adjustment buttons separately for each lot. For instance, a bidder may have the increment and decrement buttons configured to $1,000 in one lot, and configured to $1,200 in another lot. In addition, for an absolute value adjustment, a bidder may configure the increment and decrement amounts in different currencies for each lot. For instance, a bidder may configure one lot to increment and decrement bids by absolute U.S. dollar amounts, and configure another lot to increment and decrement bids by absolute Japanese yen amounts.

In addition, each bidder for a lot in an auction may be using different currencies. Therefore one bidder may configure his bid adjustment buttons to use a different currency than another bidder.

Preferably, using the bid adjustment buttons changes the value shown as the bid price 505, and the bidder must still click a separate bid confirmation button (not shown) to submit the bid to the auction or sponsor. The bid adjustment buttons are used as an easy mechanism to change a bid before submitting it to the auction. In an alternative embodiment, bids may be automatically entered into the auction (without actuation of a separate bid actuation button) when a bid adjustment button 511, 512 is used to change the bid.

Figure 5C:
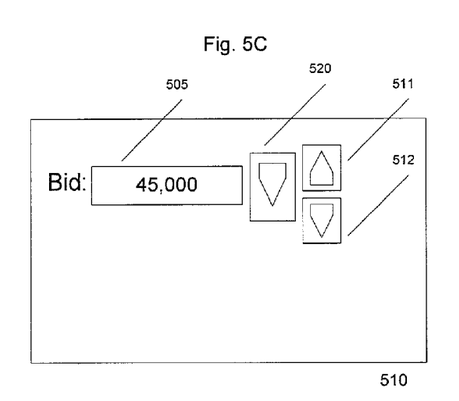

With the bidding mechanism of FIG. 5B, bidders are limited to adjusting a bid by one predefined increment or decrement. In another embodiment of the present invention, as shown in FIG. 5C, bidders can adjust a bid by a large predefined decrement using button 520, as well as increment or decrement by a small predefined increment using buttons 511, 512. This allows bidders in a reverse auction to quickly lower their bids by a large amount. For example, if a bidder wants to lower his bid by $900, and the predefined large increment is $1000, and the predefined small increment is $100, the bidder can use the large decrement button 520 to first decrement the bid by $1000, and then use the small increment button 511 to increment the bid by $100, so that in total, the bid is decremented by $900 prior to its submission to the auction or sponsor.

In the case of a forward auction, the button 520 would be a large increment button. In another embodiment (not shown), it may be possible to have both large increment and large decrement buttons.

Figure 5D:
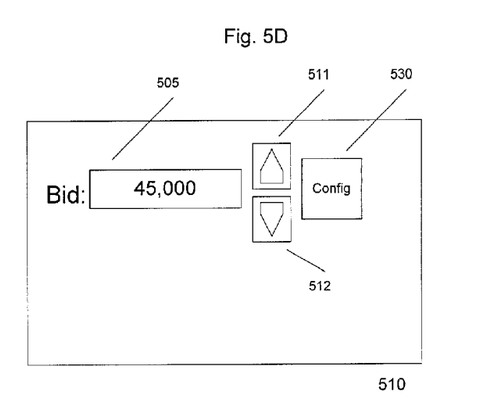

In another embodiment of the present invention, a bid adjustment configuration button 530 is added to user interface 510, as shown in FIG. 5D. In this embodiment, when a bidder clicks on the bid adjustment configuration button 530, a separate interface (shown in FIG. 6) is presented to the bidder so that the bidder can configure an amount or percent that the bid adjustment buttons 511, 512 and/or 520 will increment/decrement a previous bid prior to submission of a further bid to the auction or sponsor. This bid adjustment configuration interface allows a bidder to flexibly configure the bid adjustment buttons.

Figure 6:
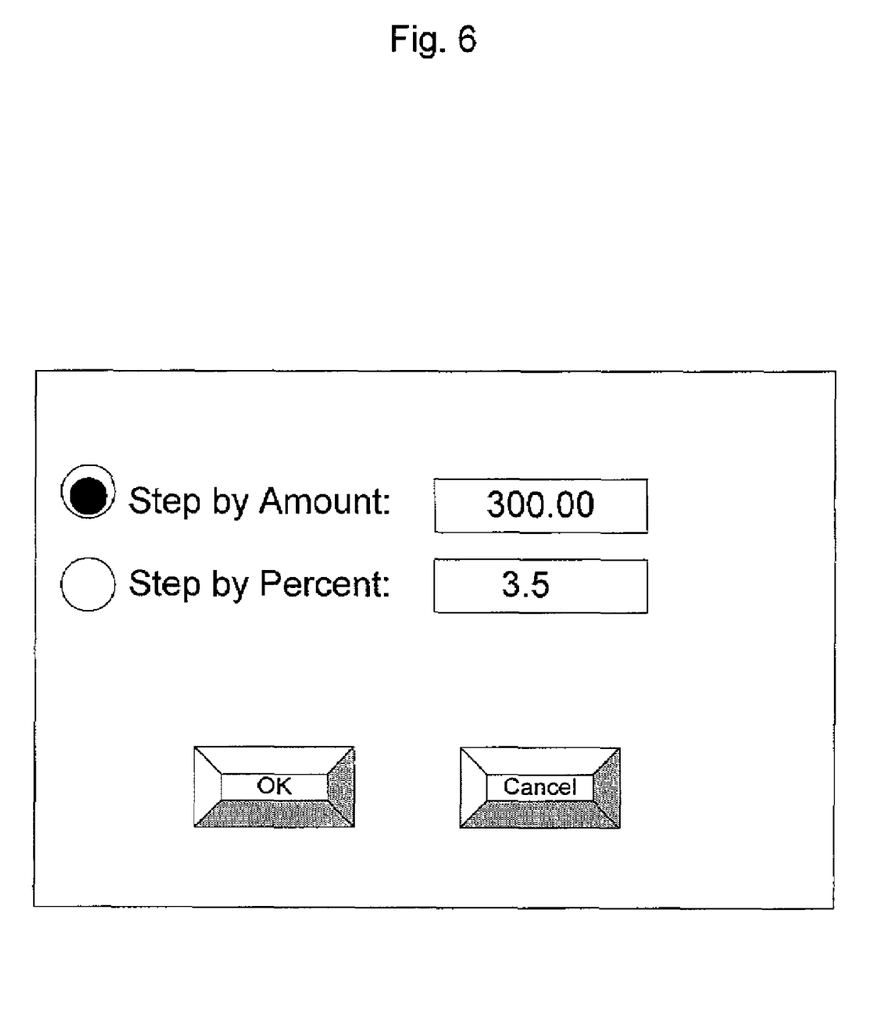
FIG. 6 illustrated a user-interface that includes buttons for configuring the operation of bid adjustment buttons, in accordance with one embodiment of the present invention.

An example of a bid adjustment configuration interface that is displayed to bidder after the bidder clicks on the bid adjustment configuration button 530 is shown in FIG. 6. As shown in this example, the bidder now has the ability to configure whether the bid adjustment buttons 511, 512 will increment or decrement the bid by an absolute amount or by a percentage. As shown in FIG. 6, the bid adjustment type is currently set to an absolute amount. If the bidder changes to "step by percent" in this configuration interface, using the bid adjustment buttons 511, 512 after the change will cause a previous bid to be incremented/decremented by the percentage entered in the configuration window. Alternatively, the bidder may choose to set the bid adjustment to a different absolute value.

In one embodiment of the present invention, the values of bid adjustment increments and decrements may be constrained. For example, if the minimum bid change for an auction, or a lot within an auction, is $500, a bidder may be constrained from being able to adjust bids by a value less than $500.

As will be apparent to one skilled in the art, many variations of this bid adjustment configuration interface are possible. For example, the bid adjustment configuration interface may include options for allowing the bidder to configure a relatively larger absolute amount/percentage for incrementing/decrementing a bid using button 520. A few other examples will be given here, but the scope of the present invention is intended to cover any variation of the bid adjustment configuration mechanism.

As discussed above, bidders in the system of the present invention may be given limited feedback. For example, a bidder may be informed by the system that his bid is in fourth place, but not informed as to the amount of the other bids. The bidder may decide that he needs to be in at least second place in a particular auction. In one embodiment of the present invention, the bidder may use the bid adjustment configuration mechanism to set the bid adjustment buttons to calculate a bid that would raise the bidder a rank or lower the bidder a rank. In this case, after setting the adjustment to rank, clicking the downward bid adjustment button 512 will adjust the bid such that it will take third place in this example. Clicking the downward bid adjustment button again will adjust the bid such that it will take second place, and so forth.

In another embodiment of the present invention, a bidder may configure his bid to be automatically adjusted in response to market conditions. For example, the bidder may be given the option to automatically adjust the bid when a bid is submitted that beats his current bid. In this example, the bidder may configure the bid to automatically beat the current best bid by 1%. As another example, the bidder may be given the option to automatically adjust his bid by a specified amount after a certain amount of time has elapsed. Copending Application entitled "Method and Apparatus for Multiple Variable Bidding in Online Auctions", which has already been incorporated, discloses methods of automatically adjusting variables using a configuration mechanism. As will be obvious to those skilled in the art, the present invention may be used to configure automatic bid adjustments in many other ways.

Figure 7A:
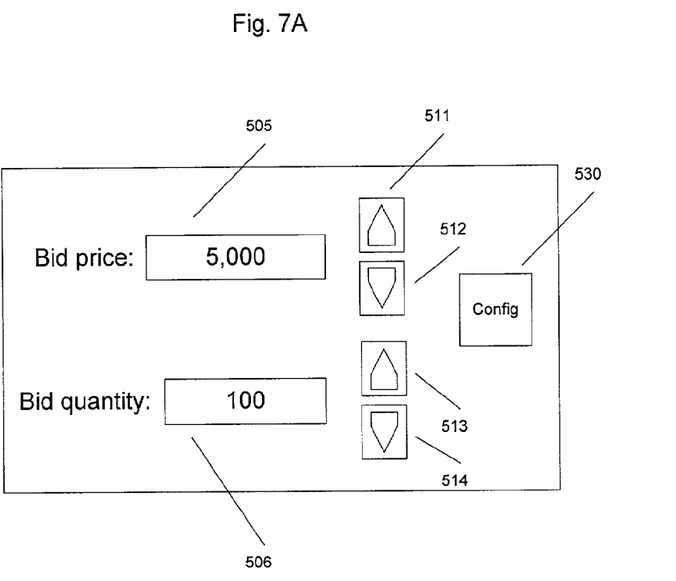
FIG. 7A illustrates a further user-interface that includes both bid price and bid quantity adjustment buttons, in accordance with a further embodiment of the present invention.
Figure 7B:
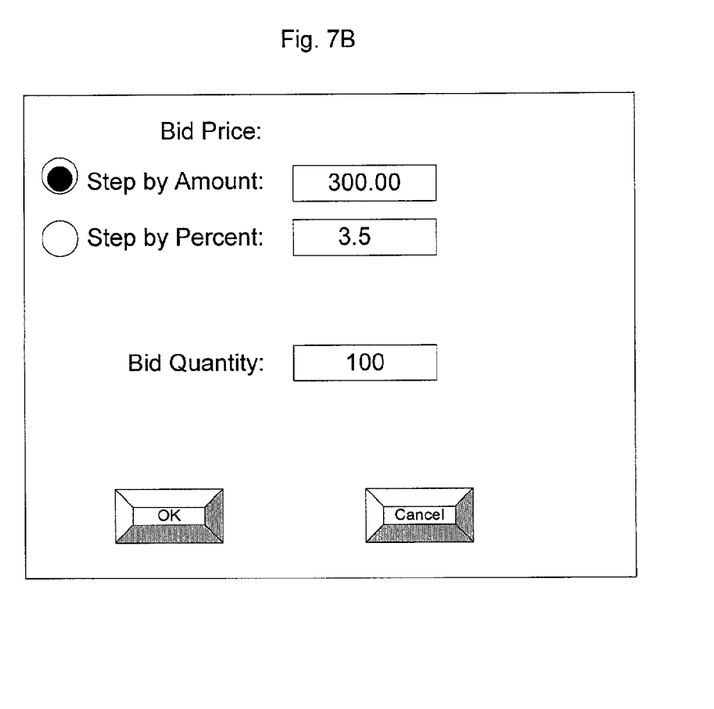
FIG. 7B illustrates a user-interface that includes buttons for configuring the operation of the bid price and bid quantity adjustment buttons shown in FIG. 7A, in accordance with a further embodiment of the invention.

Any aspect or parameter of the bid may be adjusted using bid adjustment buttons and a bid adjustment configuration interface. For example, in a particular lot, the bidders may be bidding both a price and a quantity. FIG. 7A illustrates an example of a bidding screen where bidders bid both a price and quantity when submitting a bid. In this example, both bid price 505 and bid quantity 506 have bid adjustment buttons 511, 512 for bid value, and 513, 514 for bid quantity. There is also a bid adjustment configuration button 530. Clicking on the bid adjustment configuration button 530 may display a screen similar to the one in FIG. 7B. In this bid adjustment configuration interface, the bidder may configure both the bid price bid adjustment buttons and the bid quantity bid adjustment buttons. As shown in this example, the bid price adjustment buttons may be configured to an absolute U.S. dollar amount, or to a percentage, while the bid quantity may only be configured to number of units. The bidder may configure the number of units that will be incremented/decremented when the bid quantity bid adjustment button 513, 514 is selected. As will be obvious to those skilled in the art, the bid adjustment mechanism of the present invention may be used to configure bid adjustment buttons for a bid with any number of variables.

As another example, a particular auction may be a Net Present Value (NPV) auction, wherein bids are adjusted to a Net Present Value before being compared. NPV auctions are discussed in greater detail in co-pending application Ser. No. 09/282,056, entitled "Method and System for Conducting Electronic Auctions with Net Present Value Bidding", filed Mar. 31, 1999, the disclosure of which is hereby expressly incorporated in the present application.

Generally, NPV bidding enables the creation of flexible auctions in which bidders can submit bids involving different cash flows over time. In such an auction, the bid adjustment configuration mechanism may allow the bidder to change the discount rate or contract period when making a bid. As an example, the bid adjustment increment and decrement may be configured to increase or decrease a yearly discount rate by one percentage point.

As will be obvious to one skilled in the art, the bid adjustment mechanism of the present invention may be used to configure bid adjustment buttons for any parameter of a bid. As will also be obvious to one skilled in the art, the use of buttons is not required, and any type of interface, such as a depression of particular key(s) on a keyboard, depression of a mouse button and/or voice-recognition software, may be used for incrementing/decrementing in accordance with the present invention.

What is claimed is:

1. A method of configuring a bid adjustment mechanism in an online auction, the method comprising:
    displaying a bid adjustment mechanism configuration interface including the bid adjustment mechanism that allows a bidder to specify an adjustment for a bid without entering an amount of the bid;
    setting the bid adjustment mechanism to a bid adjustment value specified by the bidder using the configuration interface; and
    adjusting a bid in the online auction by the bid adjustment value set in the configuration interface in the event that the bid adjustment mechanism is actuated by the bidder;
    wherein the bid adjustment mechanism configuration interface is configured to allow a bidder to specify a first and a second adjustment for a bid, and wherein the bid adjustment mechanism is a first bid adjustment mechanism set to the first adjustment value, and further comprising setting a second bid adjustment mechanism to a second bid adjustment value, and wherein adjusting a bid in the online auction includes determining which bid adjustment mechanism is actuated by the bidder.

2. The method of claim 1, wherein the bid adjustment mechanism is a button on a graphical user interface displayed to the bidder.

3. The method of claim 1, wherein setting the bid adjustment mechanism further comprises selecting a bid adjustment type associated with the bid adjustment value, wherein the bid adjustment type corresponds to an absolute value or a percentage of a previous bidder.

4. The method of claim 3, wherein the absolute value is measured in a currency.

5. The method of claim 4, wherein the currency is U.S. dollars.

6. The method of claim 1, wherein the bid adjustment value corresponds to a bid rank.

7. The method of claim 1, wherein the bid adjustment mechanism configuration interface is a first bid adjustment mechanism configuration interface used by the bidder to specify an adjustment for a first bid for a first lot, and further comprising displaying a second bid adjustment mechanism configuration interface to the bidder to specify an adjustment for a second bid for a second lot.

8. The method of claim 1, wherein the bid in the online auction is the bidder's bid.

9. The method of claim 1, wherein the bid in the online auction is another bidder's bid.

10. A computer-implemented apparatus for configuring a bid adjustment component of an application for submitting bids to an electronic auction, comprising:
    a user-interface that displays a bid adjustment mechanism allowing a bidder to specify an adjustment for a bid without entering an amount of the bid;
    a processor, coupled to the user-interface that sets the bid adjustment mechanism to a bid adjustment value specified by the bidder;
    wherein, upon actuation of the bid adjustment mechanism by the bidder, a bid in the electronic auction is adjusted by the bid adjustment value; and
    wherein the interface is configured to allow a bidder to specify a first and a second adjustment for a bid, and wherein the bid adjustment mechanism is a first bid adjustment mechanism set to the first adjustment value, and the processor is further configured to set a second bid adjustment mechanism to a second bid adjustment value, and wherein adjusting a bid in the online auction includes determining which bid adjustment mechanism is actuated by the bidder.

11. The apparatus of claim 10, wherein said bid adjustment component is selected from the group consisting of absolute value, percentage and rank.

12. The apparatus of claim 10, wherein the bid adjustment mechanism is a button on a graphical user interface displayed to the bidder.

13. The apparatus of claim 10, wherein the bid adjustment mechanism is a first bid adjustment mechanism used by the bidder to specify an adjustment for a first bid for a first lot, and wherein the user-interface is further configured to display a second bid adjustment mechanism to the bidder to specify an adjustment for a second bid for a second lot.

14. The apparatus of claim 10, wherein the bid in the online auction is the bidder's bid.

15. The apparatus of claim 10, wherein the bid in the online auction is another bidder's bid.

16. A computer readable medium comprising executable instructions which when executed on a processing system cause said processing system to perform a method of configuring a bid adjustment mechanism in an online auction, the method comprising:
    displaying a bid adjustment mechanism configuration interface including the bid adjustment mechanism that allows a bidder to specify an adjustment for a bid without entering an amount of the bid;
    setting the bid adjustment mechanism to a bid adjustment value specified by the bidder using the configuration interface; and
    adjusting a bid in the online auction by the bid adjustment value set in the configuration interface in the event that the bid adjustment mechanism is actuated by the bidder;
    wherein the bid adjustment mechanism configuration interface is configured to allow a bidder to specify a first and a second adjustment for a bid, and wherein the bid adjustment mechanism is a first bid adjustment mechanism set to the first adjustment value, and wherein the method is further comprising setting a second bid adjustment mechanism to a second bid adjustment value, and wherein adjusting a bid in the online auction includes determining which bid adjustment mechanism is actuated by the bidder.

17. The computer readable medium of claim 16, wherein the bid adjustment mechanism configuration interface is a first bid adjustment mechanism configuration interface used by the bidder to specify an adjustment for a first bid for a first lot, and wherein the method is further comprising displaying a second bid adjustment mechanism configuration interface to the bidder to specify an adjustment for a second bid for a second lot.

* * * * *